(12) United States Patent
Raja (10) Patent No.: US 7,207,467 B1
(45) Date of Patent: Apr. 24, 2007

(54) IDENTIFYING DEVICES FOR THE VISUALLY HANDICAPPED

(76) Inventor: Arjuna Raja, 4302 Ludlow St., Philadelphia, PA (US) 19104

( * ) Notice: Subject to any disclaimer, the term of this patent is extended or adjusted under 35 U.S.C. 154(b) by 664 days.

(21) Appl. No.: 10/390,742

(22) Filed: Mar. 19, 2003

(51) Int. Cl.
*A47G 19/012* (2006.01)
*G09B 21/00* (2006.01)

(52) U.S. Cl. ............... 222/142.4; 222/142.2; 222/480; 434/113

(58) Field of Classification Search .. 222/142.1–142.6, 222/480, 133, 556; 434/113, 114, 117
See application file for complete search history.

(56) References Cited

U.S. PATENT DOCUMENTS

| | | | | |
|---|---|---|---|---|
| 1,965,148 A | * | 7/1934 | Massa | ............... 222/142.2 |
| 2,182,623 A | * | 12/1939 | Dolar | ............... 222/142.3 |
| 5,011,032 A | | 4/1991 | Rollman | |
| 5,251,758 A | | 10/1993 | Kolacek | |
| 5,437,396 A | * | 8/1995 | Russillo et al. | .......... 222/185.1 |
| 5,753,350 A | * | 5/1998 | Bright | ............... 428/195.1 |
| 5,941,394 A | | 8/1999 | Siegler | |
| 6,138,865 A | | 10/2000 | Gilmore | |
| 6,169,707 B1 | | 1/2001 | Newland | |
| 6,227,371 B1 | | 5/2001 | Song | |
| 6,287,671 B1 | | 9/2001 | Bright et al. | |
| 6,293,403 B1 | | 9/2001 | Holmberg et al. | |
| 6,315,163 B1 | | 11/2001 | Shu | |

* cited by examiner

*Primary Examiner*—Frederick C. Nicolas
*Assistant Examiner*—Melvin A. Cartagena (57) ABSTRACT

Devices which contain tactile and visually readable identifying indicia to assist the visually handicapped in identifying room numbers and the contents of items such as condiment shakers and liquid containers. The visually readable indicia allow a sighted person to correctly associate the device with the proper item to be identified. The devices take the form of bands which fit around the condiment holders, tags which may be attached to items by tying or adhering, and sleeves which may partially or fully surround the item. The identifying devices for room numbers may be clip-on sleeves for doorknobs or plates which attach to peep-hole tubes.

1 Claim, 10 Drawing Sheets

IDENTIFYING DEVICES FOR THE VISUALLY HANDICAPPED

BACKGROUND OF THE INVENTION

1. Field of the Invention

The field of this invention relates to identifying devices which allow the visually handicapped to identify and distinguish common objects.

2. Description of the Related Art

The prior art is aware of incorporating information in the form of Braille and raised lettering on devices and containers for the visually handicapped.

U.S. Pat. No. 5,011,032 issued to Rollman on Apr. 30, 1991 describes a container for solid medicines having Braille, raised tactile lettering, and visually readable information thereon.

U.S. Pat. No. 5,251,758 issued to Kolacek on Oct. 12, 1993 describes a container having raised indicia at areas to be gripped.

U.S. Pat. No. 5,941,394 issued to Siegler on Aug. 24, 1999 discloses an organizer for injectable medications which has tactile information for instructing the visually impaired user as to time of medication.

U.S. Pat. No. 6,138,865 issued to Gilmore on Oct. 31, 2000 describes a sophisticated medicine dispenser containing multiple compartments. Each compartment contains Braille and visually readable information.

U.S. Pat. No. 6,169,707 issued to Newland on Jan. 2, 2001 describes a medication storage and reminder device containing multiple individual boxes containing tactile and visually readable indicia.

U.S. Pat. No. 6,227,371 issued to Song on May 8, 2001 describes a container for medicines in which tactile information is imprinted for the use of a visually impaired patient. A separate chart is provided which associates the tactile information with printed information for the use of a sighted caregiver.

U.S. Pat. No. 6,287,671 issued to Bright et al. on Sep. 11, 2001 discloses a container having both printed and tactile information.

U.S. Pat. No. 6,293,403 issued to Holmberg on Sep. 25, 2001 discloses an organizer containing packets of vitamins wherein the packets have tactile and printed information.

U.S. Pat. No. 6,315,163 issued to Shu on Nov. 13, 2001 discloses a dispenser which contains both Braille and raised letters.

In each of the above-mentioned containers or devices, the tactile and printed information is part of the container or device. If different information is desired or required, a new container or device is required.

SUMMARY OF THE INVENTION

The present invention provides devices for identifying objects to the visually handicapped user wherein tactile information is presented to provide the user with information, visually readable information is presented so that the sighted person handling the device will associate the device with the correct object to be identified, and the device may be easily transferred or replaced.

One example of the present invention is a band device containing tactile indicia indicating the Braille letter S or P for salt or pepper and a corresponding visually readable letter S or P for salt and pepper. The band is easily applied to and removed from a salt or pepper shaker in a restaurant. The visually handicapped user can tell which condiment is in the condiment shaker without asking for assistance or pre-testing the contents. The restaurant staff can tell from the visually readable lettering which condiment shaker should carry a particular band. Ideally, the band contains an upper lip which prevents the fingers of the user from coming into contact with the top of the shaker, thereby reducing contamination of the shaker.

The band may be in the form of a ring pre-sized to fit the particular shaker, in the form of a clip-on incomplete ring which may fit any sized shaker, or in the form of a tie-on ring which will fit any sized shaker.

The invention is not limited to salt and pepper shakers. Identifying sleeves which fit over regular caps or handles of liquid-containing cartons are included.

Also included in this invention is a clip-on identifying band which is used on doorknobs for hotel rooms and the like. The band carries a Braille indication of the room number to allow the visually handicapped user to find his or her room without assistance and a visually readable indication of the room number to allow the hotel staff to associate the band with the correct room. Instead of a band for use on the doorknob, a plate for use on the peep-hole mechanism of the door is provided. The plate contains the room number in both Braille for the visually handicapped user and visually readable indicia to ensure the hotel staff will associate the plate with the correct room.

In order to allow the visually handicapped user to pour the desired amount of condiment from a shaker, condiment shakers having pre-selected amounts to be dispensed may be used.

BRIEF DESCRIPTION OF THE DRAWING

FIG. 38 is an exploded elevational perspective view showing the top of a carton having a spout, a lid, and a cap for the lid, which cap has visually readable and tactile indicia thereon.

DESCRIPTION OF THE PREFERRED EMBODIMENTS

The invention will now be described in detail with reference to the above Figures, like identifying numerals referring to like parts throughout the description.

With reference to FIGS. 1–8, a first embodiment of the invention will now be described.

Condiment shakers 2 (preferably salt and pepper shakers) are well known in the art. These shakers 2 come in a wide assortment of shapes and sizes. Many conventional shakers 2 have a cap 4 with dispensing holes or perforations 6, a threaded neck 8 and a body 10. In order for a visually handicapped user to distinguish between a salt shaker 2 and a pepper shaker 2, the user must either ask for help, rub his or her fingers over the cap 4 of the shaker 2 to determine the number of holes 6 (salt shakers conventionally have more holes than pepper shakers), or "pre-test" the contents by shaking a small amount onto a finger and tasting the finger. Each of these methods has disadvantages. Asking for help lowers one's self-esteem. Rubbing fingers over the shaker cap 4 is unsanitary. Pre-testing is wasteful of the product.

The disadvantages of these prior methods may be avoided by placing the device 12 of the present invention outside of the neck 8 of the shaker 2 so that it is held in place by the cap 4.

The device 12 comes in a variety of forms. It may be a simple band 14 having a tab 16 containing tactile 18 and visually readable 20 indicia. It may be a full band 14 containing tactile 18 and visually readable 20 indicia. It may be a skirted band 22 having tactile 18 and visually readable 20 indicia. It may be a skirted band 22 having a ridge or tabs 24 at the top edge 26 without any tactile 18 or visual 20 markings.

The device 12 preferably contains Braille indicia 18 indicating the letters S or P for salt or pepper in order that the visually handicapped user can easily determine the contents of the shaker 2, however the tactile indicia 18 may take the form of notches or raised bars. Additionally, the device 12 should have visually readable indicia 20 in the form of a visually readable letter S or P so that the sighted restaurant staff, who are not expected to be familiar with the Braille alphabet will associate the designated device 12 with the proper shaker 2 after the shaker 2 has been washed and refilled.

Figure 1:
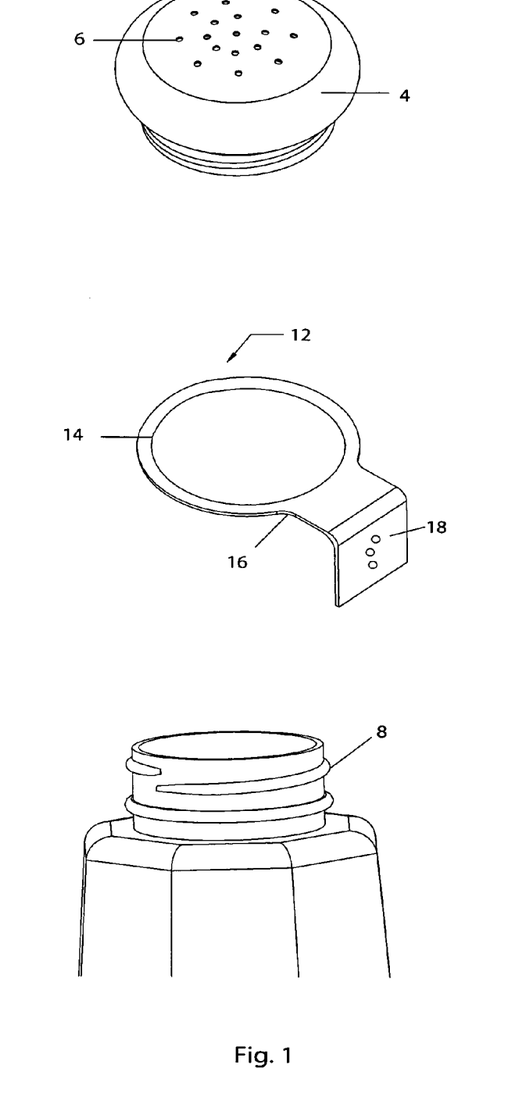
FIG. 1 is an exploded elevational perspective view of one embodiment of this invention, showing a cap, an identifying band, and a top end of a condiment shaker.
Figure 2:
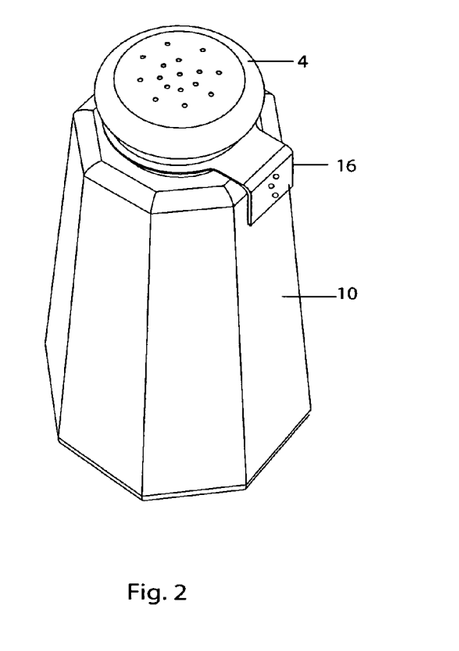
FIG. 2 is an elevational perspective view of the assembled condiment shaker of FIG. 1.
Figure 3:
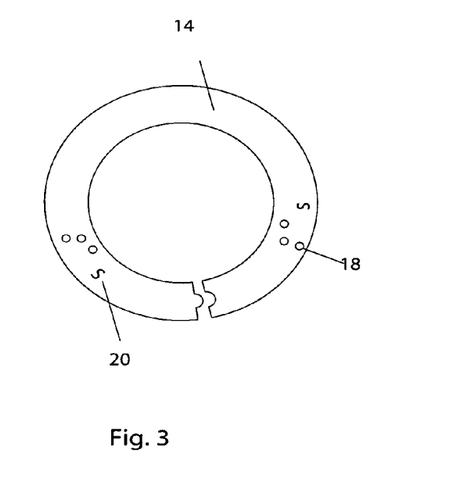
FIG. 3 is a plan view of an alternative identifying band for use in FIGS. 1 and 2.
Figure 4:
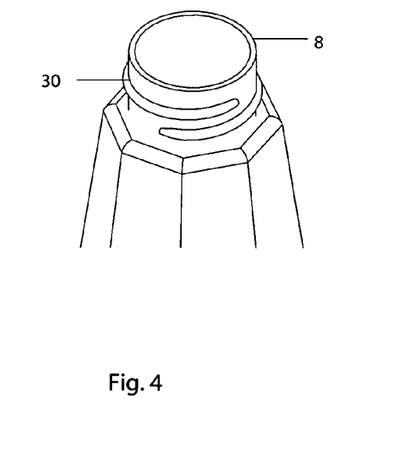
FIG. 4 is an exploded elevational perspective view of a second embodiment of this invention, showing a cap, an identifying band, and a top end of a condiment shaker.
Figure 5:
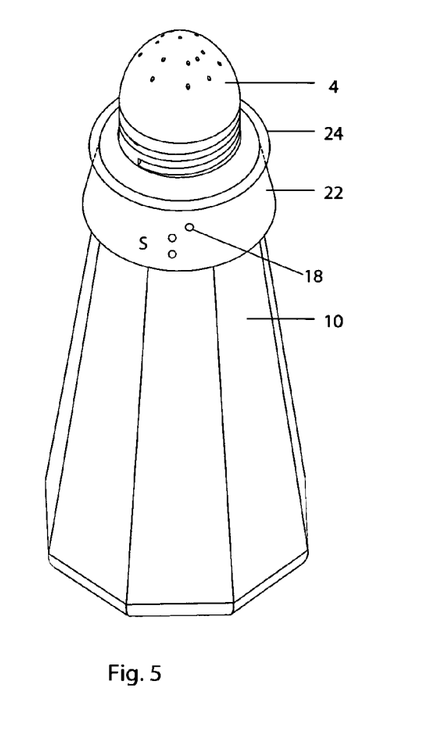
FIG. 5 is an elevational perspective view of the assembled condiment shaker of FIG. 4.

In a preferred embodiment shown in FIG. 5, the device 12 contains a ridge or tab 24 at the top edge 26 thereof. This ridge or tab 24 helps to keep the fingers of the user from touching the cap 4 and helps maintain the cleanliness of the shaker cap 4. This ridge or tab 24 may be used independently of the Braille and visually readable markings so that the device may comprise an upper surface having perforations and a circumference, outwardly extending tabs or ridge 24 along the circumference of the upper surface, and a neck which joins with the neck of the shaker. The joining may be by friction fit or by threads.

Figure 6:
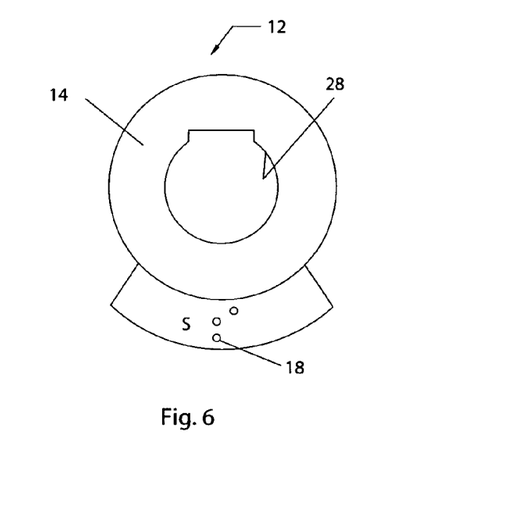
FIG. 6 is a plan view of an alternative identifying band for use in FIGS. 4 and 5.

In the device 12 shown in FIG. 6, the inside diameter 28 of the band 14 is slightly smaller than the outside diameter 30 of the neck 8 of the shaker 2. Thus, in placing the device 12 on the threaded neck 8, the band 14 may be threaded onto the neck 8 and held in place even in the absence of the cap 4.

Figure 7:
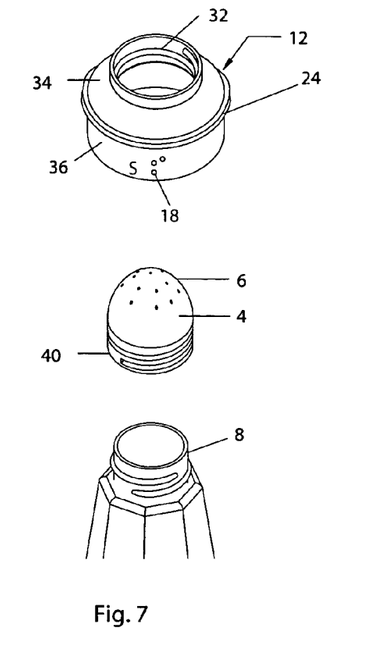
FIG. 7 is an exploded elevational perspective view of a third embodiment of this invention, showing an identifying band, a cap, and a top end of a condiment shaker.
Figure 8:
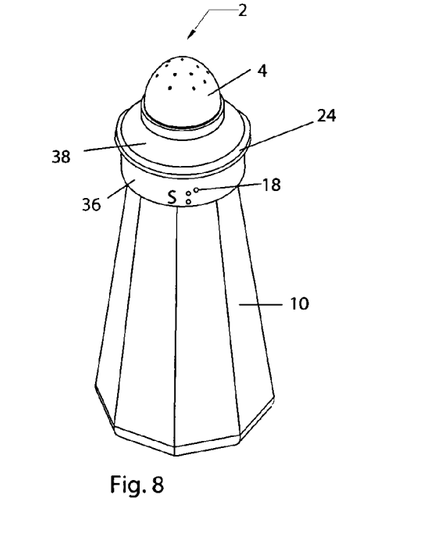
FIG. 8 is an elevational perspective view of the assembled condiment shaker of FIG. 7.

Another embodiment of this invention is depicted in FIGS. 7 and 8. In this embodiment, the device 12 has an upwardly extending threaded upper portion 32, a downwardly and outwardly extending shoulder portion 34, and a downwardly extending lower portion 36. The lower portion 36 contains the tactile 18 and visually readable indicia 20. At the top edge 38 of the lower portion 36, there is a ridge 24 to prevent the fingers of the user from extending upwardly to the cap 4. In this embodiment, the cap 4 is threaded onto the neck 8 of the shaker 2 by its interior threads (not shown) in the usual manner and the threaded upper portion 32 of the device 12 is threaded onto the exterior threads 40 of the cap 4 to keep the device 12 in place.

Figure 9:
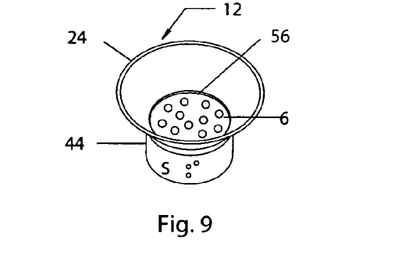
FIG. 9 is an elevational perspective view showing a device of this invention having an identifying band as a lower section, a perforated cover, and an open-mouthed upper section.
Figure 10:
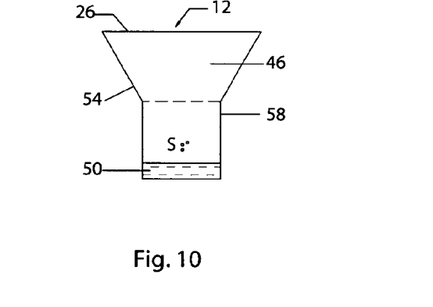
FIG. 10 is an elevational side view of the device shown in FIG. 9.
Figure 11:
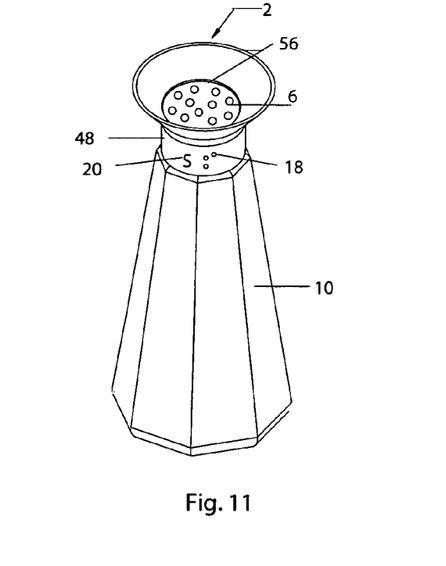
FIG. 11 is an elevational perspective view showing the device depicted in FIGS. 9 and 10 mounted on a condiment shaker.

Another embodiment is depicted in FIGS. 9–11. In this embodiment, the conventional cap 4 for the condiment shaker 2 is not used. Rather, the device 12 contains a lower section 44 and an upper section 46. The lower section 44 contains tactile 18 and visually readable 20 indicia on the outer surface 48 and threads (in phantom) 50 on the inner surface (not shown). The upper section 46 is wider at the top edge 26 than at the bottom 54 and contains a ridge 24 at the top edge 26 for the reasons set forth above. A cover 56 having dispensing holes 6 is located at the juncture 58 of the upper 46 and lower 44 sections, which perforated cover 56 serves as the outlet for the condiment. The device 12 is connected to a condiment shaker 2 by threading the threads 50 of the lower section 44 of the device 12 into the threaded neck of neck 8 of the condiment shaker 2.

Additional embodiments will be described with reference to FIGS. 12–20.

Figure 12:
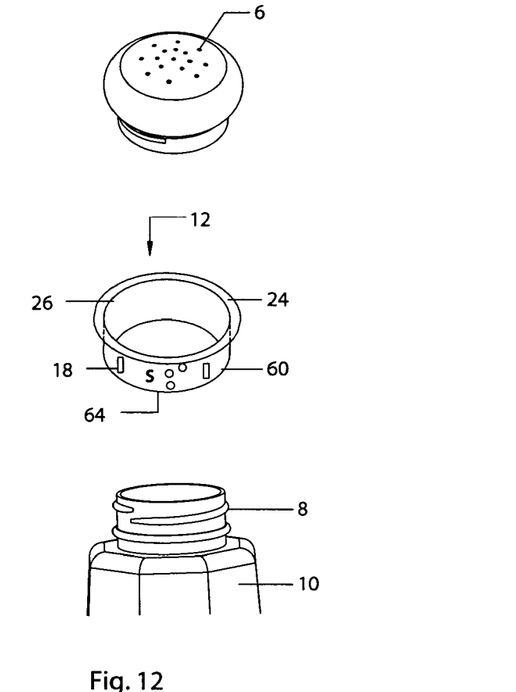
FIG. 12 is an exploded elevational perspective view showing a cap, an identifying band, and a top end of a condiment shaker.
Figure 13:
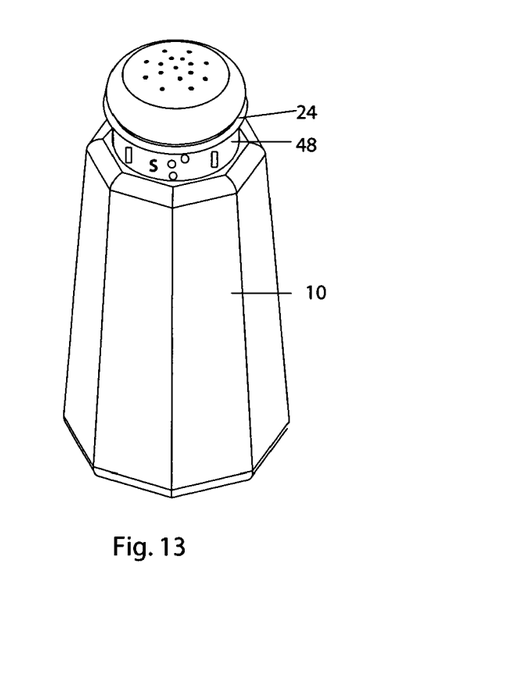
FIG. 13 is an elevational perspective view of the assembled condiment shaker of FIG. 12.

Referring to FIGS. 12 and 13, the device 12 of this invention is in the form of a circular band 60 having a top edge 26 and a bottom edge 64. The outer surface 48 of the band 60 contains tactile 18 and visually readable 20 indicia. For the benefit of those visually handicapped users who are not familiar with the Braille system, the device 12 contains additional tactile identifiers 18. These identifiers 18 may be raised hemispheres or lines. A single identifier 18 may represent salt while two identifiers 18 may represent pepper. The top edge 26 of the band 60 contains a ridge 24 which alerts the user to the position of the fingers on the shaker 2. The band 60 is placed over the neck 8 of the shaker 2 and the cap 4 of the condiment shaker 2 is threaded into place, thereby securing the band 60.

Figure 14:
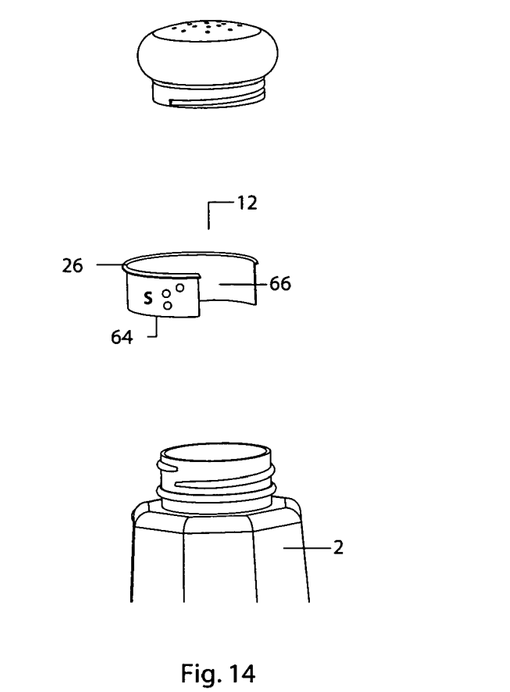
FIG. 14 is an exploded elevational perspective view showing a cap, an identifying clip-on device, and a top end of a condiment shaker.
Figure 15:
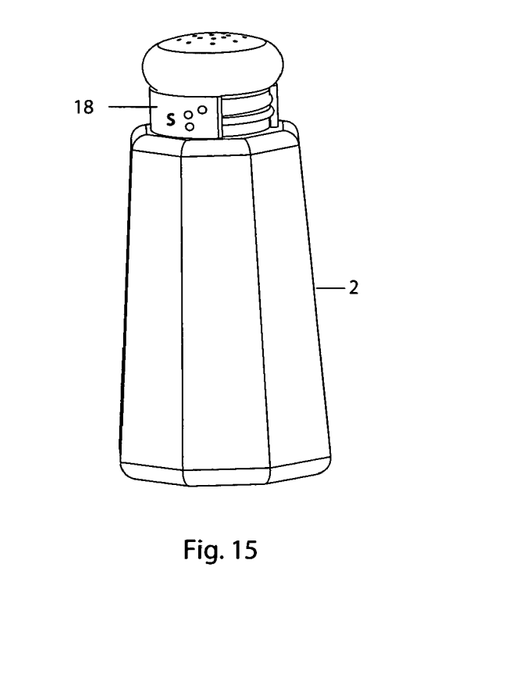
FIG. 15 is an elevational perspective view of the assembled condiment shaker of FIG. 14.

A similar device 12 is depicted in FIGS. 14 and 15 wherein the device 12 of this invention is shown in the form of a clip-on band 66 having a top edge 26 and a bottom edge 64. The outer surface 48 of the band 66 contains tactile 18 and visually readable 20 indicia. For the benefit of those visually handicapped users who are not familiar with the Braille system, the device contains additional tactile identifiers 18. These identifiers 18 may be raised hemispheres or lines. A single identifier 18 may represent salt while two identifiers 18 may represent pepper. The top edge 26 of the band 66 contains a ridge 24 which alerts the user to the position of the fingers on the shaker 2. The band 66 is simply clipped onto the neck 8 of an assembled shaker 2 where it is held by a spring-like force.

Figure 16:
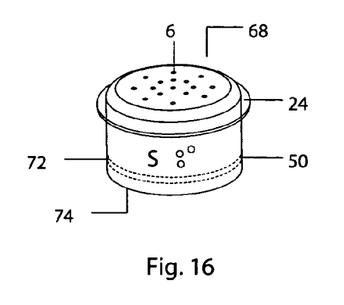
FIG. 16 is an elevational perspective view showing a cap of this invention.

Another embodiment is now described with reference to FIGS. 16–19. In FIG. 16, the cap 68 features a circumferential ridge 24 which prevents fingers from contacting the top surface 70 of the cap 68. The body portion 72 of the cap 68 has an inner surface (not shown) containing threads 50 (shown in phantom) which thread into the threaded neck 8 of the shaker 2. The body portion 72 of the cap 68 has an outer surface 74 which contains tactile 18 and visually readable 20 indicia. The cap 68 shown in FIG. 16 may be used alone or it may be used in conjunction with the circular band 76 of FIG. 17. The band 76 contains an outer surface 74 having tactile 18 and visually readable 20 indicia to indicate the contents of the shaker 2. The inner circumference of the band 76 is greater than the outer circumference of the cap 68. The top edge 26 of the band 76 contains a plurality (preferably two) of upward projections 78. As depicted in FIG. 18, in use, the band 76 is placed over the neck 8 of the shaker 2 and the cap 68 is threaded onto the neck 8 of the shaker 2. The force of the ridge 24 of the cap 68 against the projections 78 of the band 76 holds the band 76 in place and prevents rotational movement.

Figure 17:
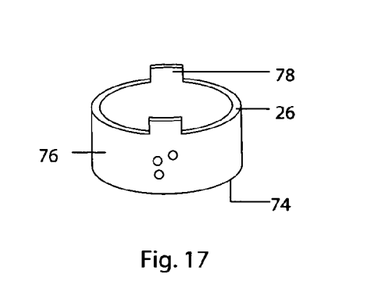
FIG. 17 is an elevational perspective view of a sleeve of this invention.
Figure 18:
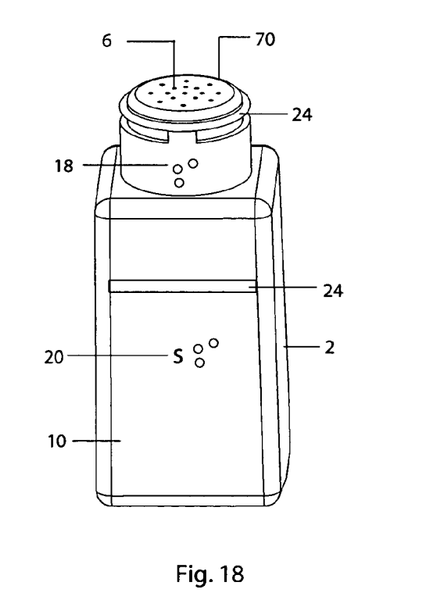
FIG. 18 is an elevational perspective view of a condiment shaker containing the cap and sleeve of FIGS. 16 and 17.
Figure 19:
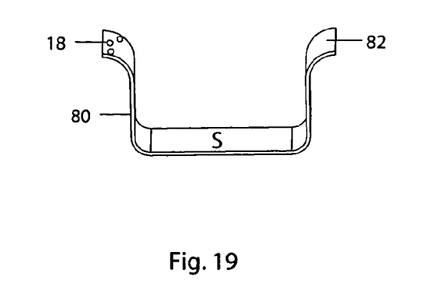
FIG. 19 is an elevational perspective view of a holding clip for a condiment shaker.
Figure 20:
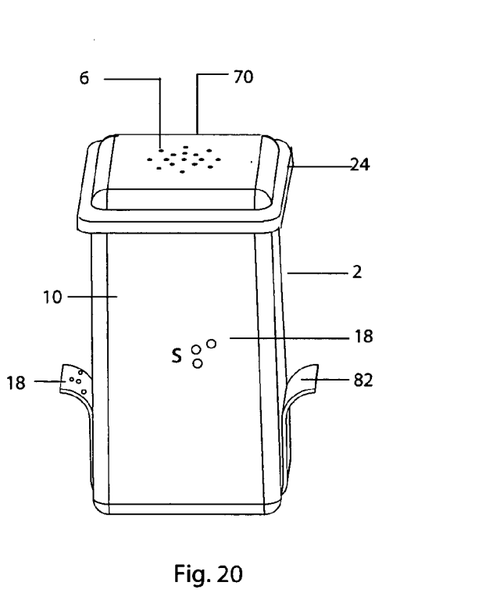
FIG. 20 is an elevational perspective view of the condiment shaker of FIG. 18 in the holding clip of FIG. 19.

The clip 80 depicted in FIG. 19 may be used independently of, or in conjunction with, the cap 68 and/or band 76 shown in FIGS. 16 and 17. The clip 80 of FIG. 19 contains tactile and visually readable indicia (not shown) on the outer side surfaces thereof. As shown in FIG. 20, the condiment shaker 2 fits easily into the clip 80 and the clip is held in place by spring-like action. The outward flanges 82 of the clip 80 help to improve the grip of the user of the shaker 2.

Additional embodiments are disclosed in FIGS. 21–26.

Figure 21:
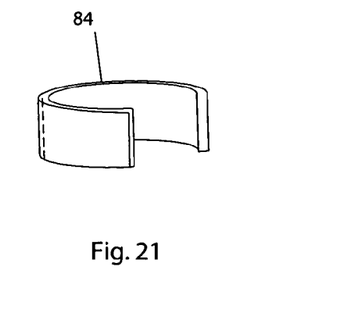
FIG. 21 is an elevational perspective view of a clip-on sleeve which fits around the neck of a condiment shaker.

FIG. 21 depicts a clip-on sleeve 84 which fits on the neck 8 of a condiment shaker 2 and is held in place by spring-like action. When in place there is an open space between the two ends of the clip-on sleeve 84.

Figure 22:
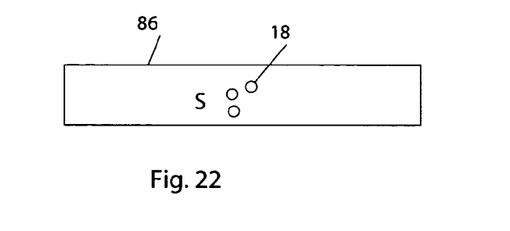
FIG. 22 is an elevational front view of a strip containing Braille indicia and printing which can be inserted into the sleeve of FIG. 21.

FIG. 22 shows a strip 86 containing both tactile 18 and visually readable 20 indicia which is adapted to be folded so as to fit within the clip-on sleeve 84 of FIG. 21.

Figure 23:
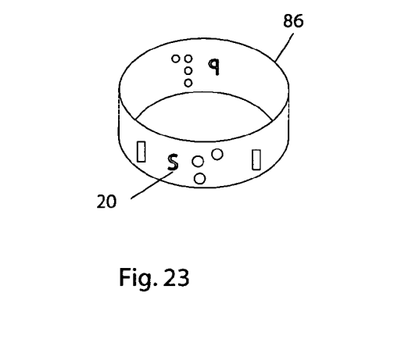
FIG. 23 is an elevational perspective view of another strip with Braille and printing in more than one area to allow for interchangeable use in the sleeve depicted in FIG. 21.

FIG. 23 shows a circular strip 86 containing multiple interchangeable tactile 18 and visually readable 20 indicia which is adapted to be placed into the clip-on sleeve 84 of FIG. 21.

Figure 24:
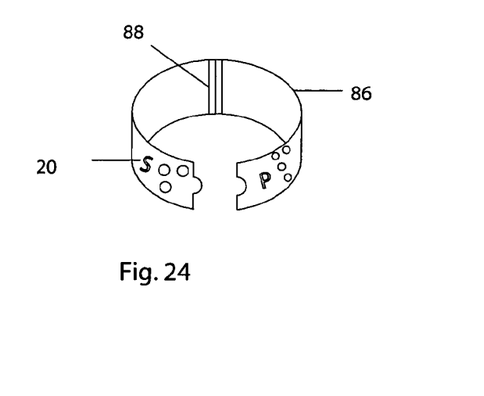
FIG. 24 is an elevational perspective view of a third strip which fits into the sleeve of FIG. 21. This sleeve has a living hinge and Braille and visually readable indicia in two areas.

FIG. 24 shows a strip 86 with a living hinge 88 containing multiple tactile 18 and visually readable 20 indicia adapted to be compressed so as to fit within the clip-on sleeve 84 of FIG. 21.

Figure 25:
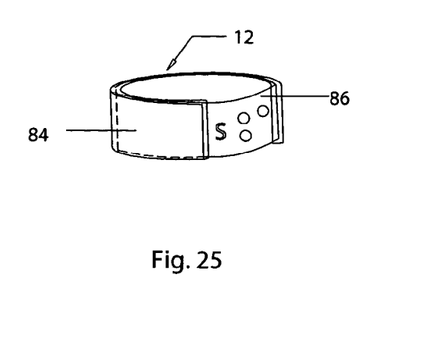
FIG. 25 is an elevational perspective view of the sleeve of FIG. 21 containing a strip as portrayed in FIGS. 22–24.
Figure 26:
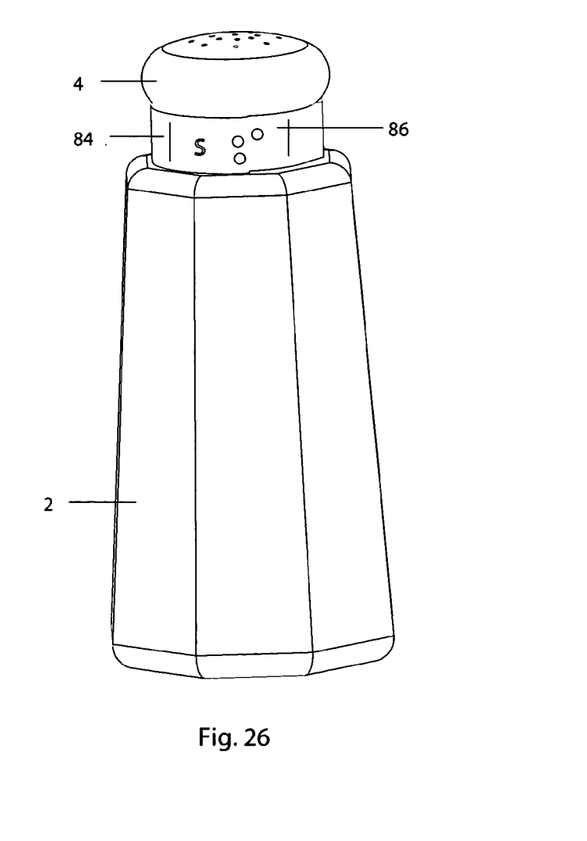
FIG. 26 is an elevational perspective view of a condiment shaker with the sleeve of FIG. 25 around the neck thereof.

In use, the above strips 86 may be inserted into the clip-on sleeve 84 in such a way that the desired indicia 18, 20 appear in the open space as shown in FIG. 25. This assembled device 12 is placed around the neck 8 of a condiment shaker 2 and the cap 4 is threaded into the neck 8 to hold the device 12 in place as shown in FIG. 26.

Figures 27, 28, 29, 30:
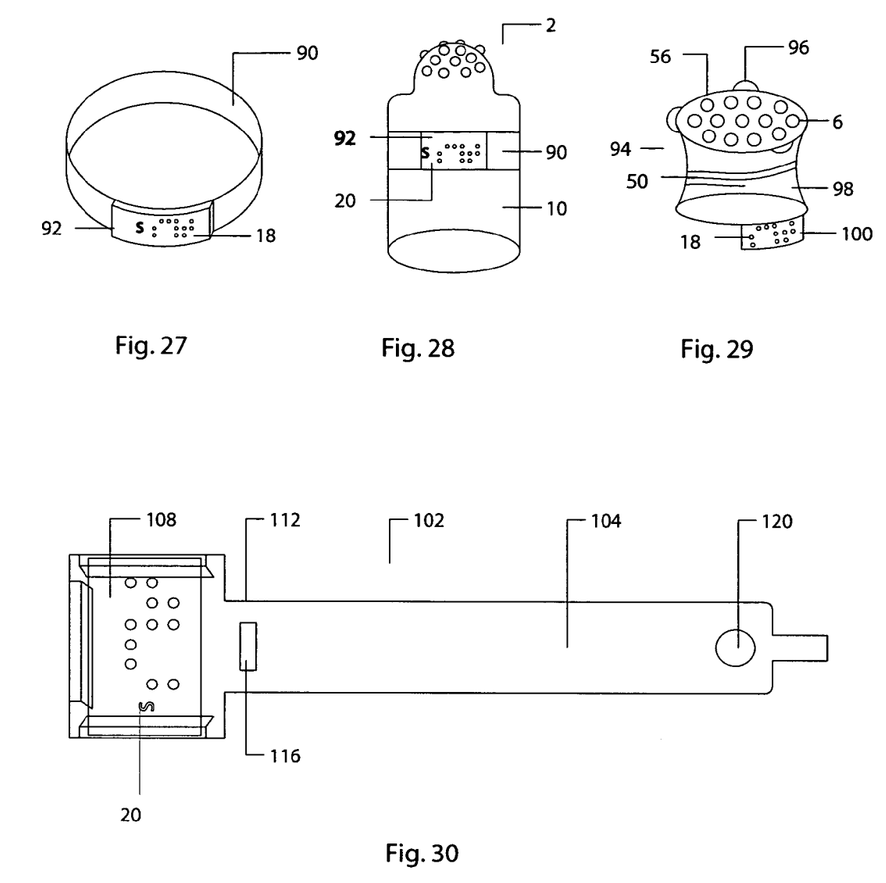
FIG. 27 is an elevational perspective view of an elastic band having tactile and visually readable indicia on a thickened portion thereof.
FIG. 28 is an elevational side view of a condiment shaker having the band of FIG. 27 thereon.
FIG. 29 is an elevational perspective view of a cap cover having a downwardly projecting wall having a device bearing tactile and visually readable indicia and projections at the top edge.
FIG. 30 is an elevational front view of a tag of this invention.

In FIGS. 27 and 28 an embodiment is shown in which an elastic band 90 having tactile 18 and visually readable 20 indicia on a thickened portion 92 of the band 90 is adapted to fit around the body 10 of a condiment shaker 2. The circumference of the elastic band 90 in its relaxed state is smaller than that of the condiment shaker 2. Therefore, the band 90 is securely held in place by elastic action. By placing the tactile 18 and visually readable 20 indicia on a thickened portion 92 of the band, distortion of the indicia 18, 20 due to stretching is eliminated.

FIG. 29 depicts a substitute cap 94 for a condiment shaker 2. This cap 94 contains a cover 56 having dispensing holes 6. There are outwardly extending tabs 96 along the circumference of the cover 56. These tabs 96 prevent the fingers of the user from contacting the perforations 6. The cap 94 contains a neck 98 which has threads 50 which thread into the neck 8 of the shaker 2. A depending wall 100 contains tactile 18 and visually readable 20 indicia to indicate the contents of the shaker 2.

Figure 31:
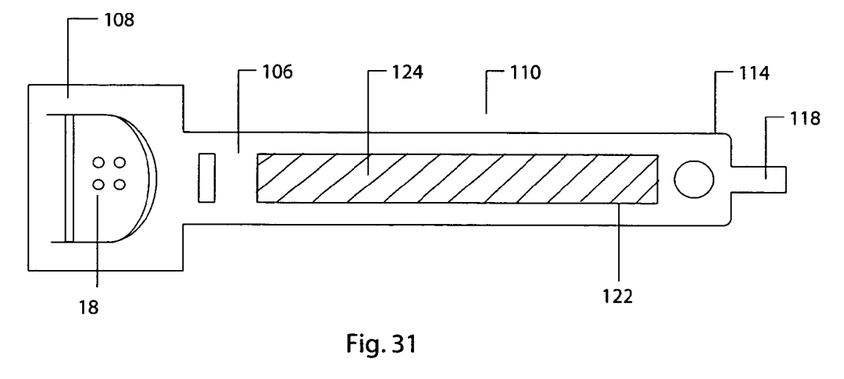
FIG. 31 is an elevational rear view of a tag of this invention.

FIGS. 30 and 31 depict a multi-purpose tag 102. The tag 102 has a front 104 and a rear 106 surface with a main message area 108 on each surface 104, 106. The main message area 108 contains tactile 18 and visually readable 20 indicia. The main message area 108 is attached to a strap 110 having a proximal end 112 and a distal end 114. The proximal end 112 contains a slot 116 and the distal end 114 contains a tongue 118 configured to fit into the slot 116 to form a circular band containing a message area 108 attached thereto. A hole 120 for receiving a hanging device, such as a nail or hook, is present at the distal end 114 of the strap 110. Additionally, the rear surface 106 of the strap 110 contains an area 122 of adhesive covered by a peel-off cover 124. The adhesive area 122 may be used for adhering the strap 110 containing the message area 108 to a surface.

Figure 32:
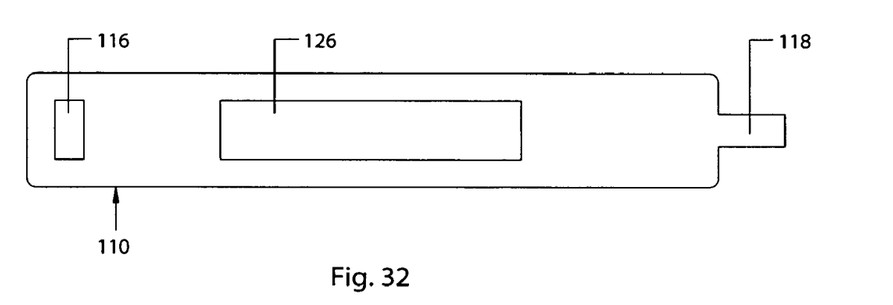
FIG. 32 is an elevational front view of an unfinished tag of this invention.
Figure 33:
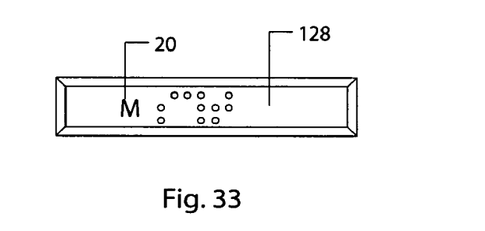
FIG. 33 is an elevational front view of a label adapted to fit into the marked area of the tag of FIG. 32.
Figure 34:
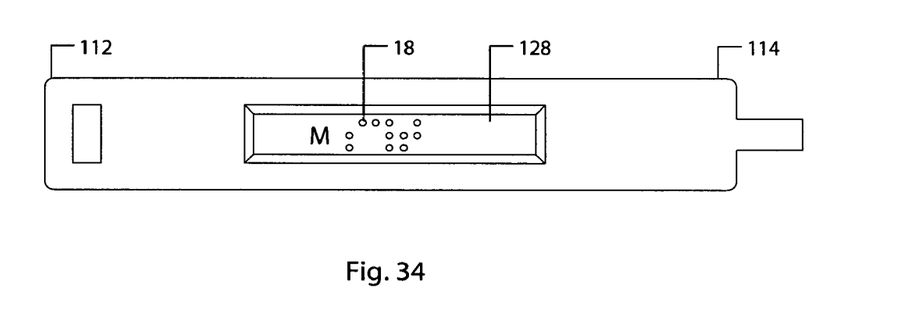
FIG. 34 is an elevational front view of the tag of FIG. 32 having the label of FIG. 33 in the marked area.

FIGS. 32–34 depict another strap 110 containing tactile 18 and visually readable 20 indicia. The strap 110 has a proximal end 112 containing a slot 116 and a distal end 114 containing a tongue 118 configured to fit into the slot 116 to form a circular band. The strap 110 contains a window 126 between the slot 116 and the tongue 118 adapted to receive a label 128. A label 128 containing tactile 18 and visually readable 20 information is inserted into the window 126 of the strap 110 to produce the strap 110 depicted in FIG. 34.

Figure 35:
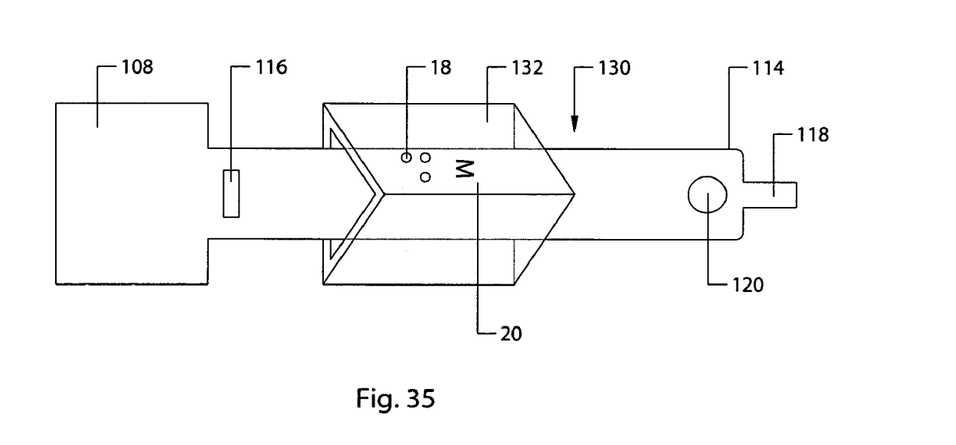
FIG. 35 is an elevational front view of a tag of this invention carrying a sleeve bearing multiple messages in tactile and visually readable indicia.

FIG. 35 depicts a multipurpose strap 130. The strap 130 comprises an enlarged main message area 108 as set out above in FIGS. 30 and 31. This message area 108 may contain tactile 18 and visually readable 20 information messages. The main message area 108 is attached to a strap 110 having a proximal end 112 and a distal end 114. The proximal end 112 contains a slot 116 and the distal end 114 contains a tongue 118 configured to fit into the slot 116 to form a circular band containing a message area 108 attached thereto. A hole 120 for receiving a hanging device, such as a nail or hook, is present at the distal end 114 of the strap 110. Additionally, a multi-sided sleeve 132 having tactile 18 and/or visually readable 20 information on at least one side encloses the strap 110. The sleeve 132 is prevented from falling off of the strap 110 by the large size of the main message area 108.

Figure 36:
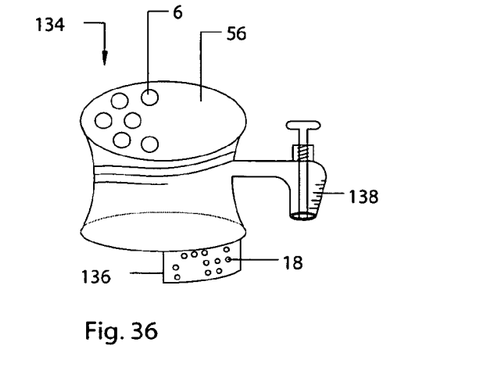
FIG. 36 is an elevational perspective view of a top of a condiment shaker showing a device having tactile indicia and a measuring chamber having a spout in the closed position.

FIG. 36 depicts a cap 134 for a dispenser 2 of granular solids. The cap 134 has threads 50 for attachment to the neck 8 of a conventional condiment shaker 2. Perforations 6 for dispensing the condiment or other granular solid cover approximately one-half of the cover 56 of the cap 134. A depending tag 136 contains tactile 18 and visually readable 20 information identifying the contents of the condiment shaker 2. A measuring chamber 138 having a bottom opening 140 extends from the cap 134 on the side which is opposite the perforations 6. Thus, the user can hold the shaker 2 downwardly and, with shaking in the conventional manner, expel an unmeasured amount of the enclosed condiment. Alternatively, the user can hold the shaker 2 downwardly at an angle such that condiment does not fall through the perforations 6, but enters the measuring chamber 138. The shaker 2 may be tilted back and forth until the desired amount is in the measuring chamber 138. Caps 134 may be made having measuring chambers 138 of varying sizes so that visually handicapped users can independently adjust the amount of condiment in the measuring chamber 138 by tilting the shaker 2 to fill the chamber 138 and then tilting the shaker 2 slightly past the vertical position to expel excess condiment from the measuring chamber 138.

Figure 37:
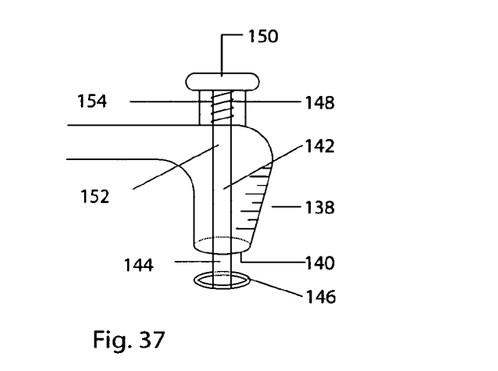
FIG. 37 is an elevational side view of the measuring chamber shown in FIG. 36 wherein the spout is in the open position.

There is a connecting rod 142 inside the measuring chamber 138. The bottom end 144 of the connecting rod 142 is connected to a closure 146. The top end 148 of the connecting rod 142 is connected to a push button 150. The upper portion 152 of the connecting rod 142 extends out of the measuring chamber 138 and is biased upwardly by a spring 154 to keep the measuring chamber 138 closed in normal conditions. The connecting rod 142 may by pushed down by light finger pressure on the push button 150 to force the closure 146 down and open the bottom opening 140 to expel the contents of the measuring chamber 138.

FIG. 38 shows an embodiment of this invention wherein a conventional liquid-containing carton 156 having a spout 158 and a cap 160 is supplied with an open or closed cylindrical sleeve 162 having tactile 18 and visually readable 20 markings to aid in the identification of the contents of the carton 156. The sleeve 162 may have internal ribs 164 which mate with the external ribs 166 of the cap 160 to maintain contact of the sleeve 162 with the cap 160.

Figure 39:
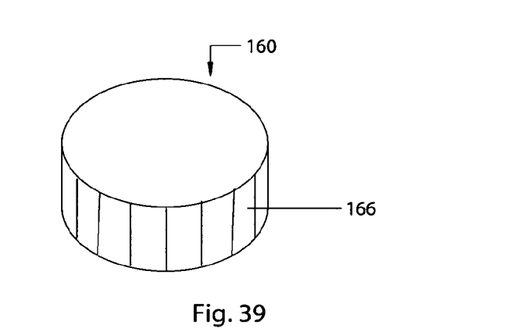
FIG. 39 is an exploded elevational perspective view in detail showing a lid and cap where the lid has a pull tab.
Figure 40:
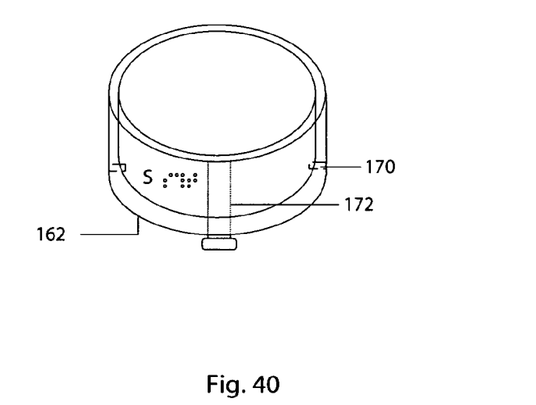
FIG. 40 is an elevational view of the lid of the present invention covering the cap of a carton.

Another embodiment of this concept is depicted in FIGS. 39 and 40. The cap 160 is a conventional cap having external ribs 166. In this embodiment, the sleeve 162 is provided with tactile 18 and visually readable 20 information regarding the contents of the container (not shown). The sleeve 162 contains a top 168. The sleeve 162 is further provided with a plurality of inward protrusions 170 which slip under the cap 160 to keep the sleeve 162 in contact with the cap 160. The sleeve 162 has a pull-tab 172 for easy opening and access to the cap 160.

Figure 41:
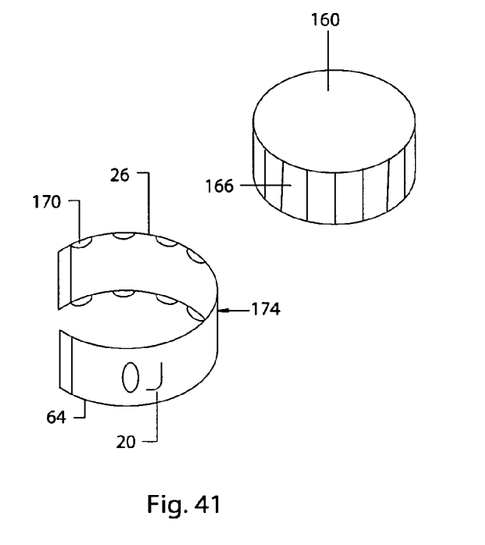
FIG. 41 is an elevational perspective view of a clip-on sleeve having tactile and visually readable indicia and a carton cap.

This invention also contemplates a clip-on sleeve 174 as shown in FIG. 41. The sleeve 174 is for use with a conventional cap 160 having external ribs 166. The sleeve 174 is provided with tactile 18 and visually readable 20 indicia indicating the contents of the container (not shown). The top 26 and bottom 64 edges of the sleeve 174 have inward protrusions 170 which serve to hold the sleeve 174 on the cap 160.

Figure 42:
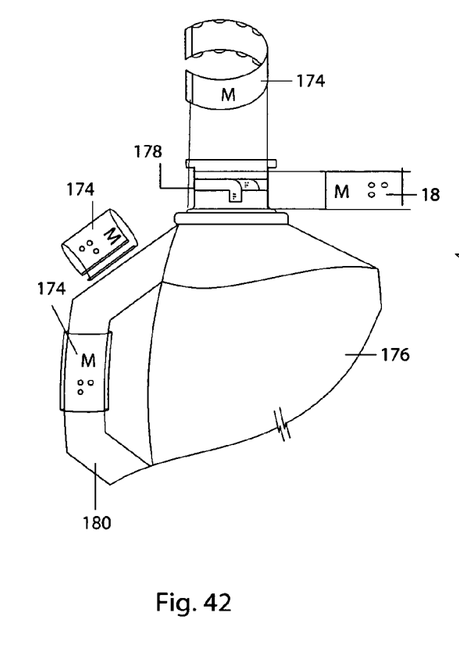
FIG. 42 is an elevational perspective view showing a liquid-containing container having a variety of devices of the present invention associated therewith.

As portrayed in FIG. 42, the clip-on sleeves 174 described above find utility in describing the contents of containers 176 with necks 178 and/or handles 180. FIG. 42 shows a conventional milk jug. The clip-on sleeves 174 of this invention are used to identify the product and the butterfat content of the product.

Figure 43:
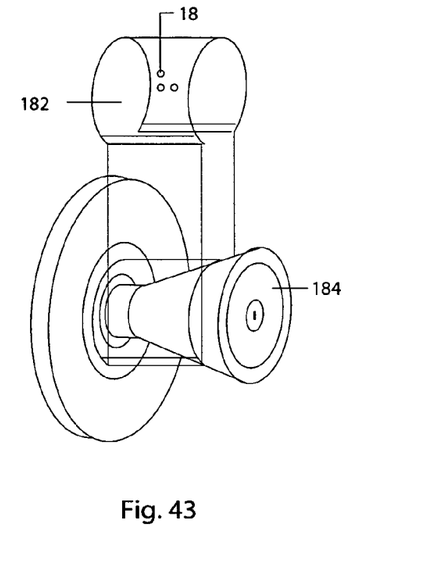
FIG. 43 is an exploded elevational perspective view of a doorknob having a clip-on sleeve bearing tactile indicia indicating the room number.
Figure 44:
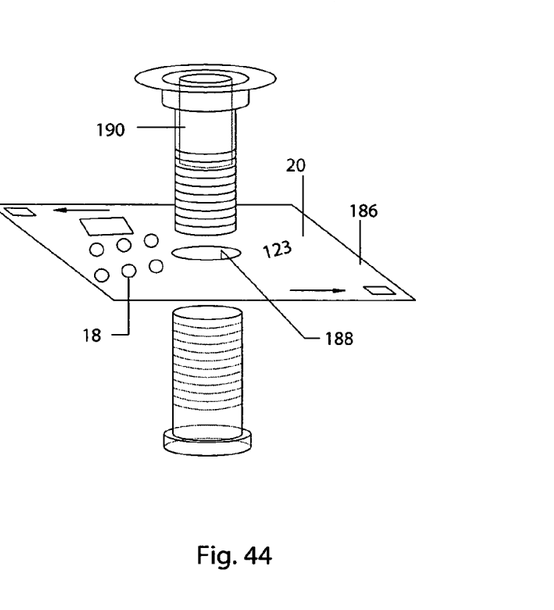
FIG. 44 is an exploded elevational perspective view of a peep-hole device for a door having a plate mounted thereon, which plate has tactile and visually readable indicia to indicate the room number.

FIGS. 43 and 44 depict additional uses for the concept of this invention. Presently, where available, Braille indications of room numbers for hotels, motels, nursing homes, and hospitals are present on walls somewhere adjacent to the doors. This requires that the visually handicapped person must continually seek out the room numbers and then find the corresponding door. By providing room numbers on a predetermined place on the door, the visually handicapped user can first find a door and check its number, then move an anticipated number of doors and ascertain that the number corresponds with the desired one.

According to FIG. 43, a clip-on sleeve 182 bearing tactile 18 indicia of the room number is inserted on a doorknob 184 where it can be easily located. The clip-on sleeve 182 may have the tactile 18 and visually readable 20 indicia attached directly as part of the sleeve 182 or there may be a window in the sleeve 182 for receiving pre-printed readable tapes bearing information as to the room numbers, men's room, etc. The sleeve 182 may be attached to the doorknob by the natural spring action of the sleeve 182 or there may be an "L"-shaped bracket holding a tab which is attached to the lock flange, preferably with a screw.

FIG. 44 depicts a flat plate 186 having tactile 18 and visually readable 20 information regarding the room number. The plate is so configured as to have a hole 188 which fits around a conventional peep-hole tube 190 on a door. Thus, a visually handicapped user can easily locate and ascertain the desired room number. Preferably, the flat plate 186 contains a window adapted to receive a tape bearing the tactile 18 and visually readable 20 indicia.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A cap for a dispenser for solid granules, which cap comprises a top surface, a wall having internal threads, perforations for allowing the passage of the solid granules from the dispenser, which perforations cover approximately one-half of the top surface of the cap, a depending tag containing tactile and visually readable information identifying the contents of the dispenser, a measuring chamber extending from the neck on a side which is opposite the perforations, which measuring chamber comprises a bottom opening, a connecting rod inside the measuring chamber, which connecting rod has an upper portion, a bottom end and a top end, the bottom end of the connecting rod being connected to a closure, the top end of the connecting rod being connected to a push button, and the upper portion of the connecting rod extending out of the measuring chamber and being biased upwardly by a spring to keep the measuring chamber closed in normal conditions so that the connecting rod may be pushed down by light finger pressure on the push button to force the closure down and open the bottom opening to expel the contents of the measuring chamber.

* * * * *